United States Patent
Bredin et al.

(10) Patent No.: US 6,219,744 B1
(45) Date of Patent: Apr. 17, 2001

(54) INTERRUPT MASKER FOR AN INTERRUPT HANDLER WITH DOUBLE-EDGE INTERRUPT REQUEST SIGNALS DETECTION

(75) Inventors: Francis Bredin, Maisons-Alfort; Gerard Boudon, Mennecy; Jean-Michel Proust, Corbeil-Essonnes, all of (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/271,716

(22) Filed: Mar. 18, 1999

(30) Foreign Application Priority Data

Mar. 20, 1998 (EP) .................................................. 98480014

(51) Int. Cl.$^7$ ..................................................... G06F 13/24
(52) U.S. Cl. ............................................................. 710/262
(58) Field of Search ..................................... 710/260, 262

(56) References Cited

U.S. PATENT DOCUMENTS

| | | | |
|---|---|---|---|
| 5,535,420 | 7/1996 | Kardach et al. | 710/48 |
| 5,555,413 | 9/1996 | Lohman et al. | 710/260 |
| 5,555,420 | 9/1996 | Sarangdhar et al. | 710/266 |
| 5,928,348 | * 7/1999 | Mukai et al. | 710/262 |

FOREIGN PATENT DOCUMENTS 0 628 913 A1   12/1994   (EP) .............................. G06F/13/24

* cited by examiner

Primary Examiner—Xuan M. Thai
(74) Attorney, Agent, or Firm—Lynn L. Augspurger

(57) ABSTRACT

An interrupt masker for use in an interrupt handler which receives interrupt request signals in the form of edge detection or level assertion is disclosed. The interrupt masker comprises interrupt detection means for detecting edge transitions of interrupt request signals. The interrupt masker also comprises a polarity detection means for detecting edge transitions of a polarity control signal which is inverted for each inversion polarity request. A filtering means which is coupled to the interrupt detection means and to the polarity detection means generates an interrupt request pulse according to the assertion of the polarity control signal. The interrupt request pulse is generated in response of either rising or falling edge transitions of the interrupt request signal.

15 Claims, 9 Drawing Sheets

INTERRUPT MASKER FOR AN INTERRUPT HANDLER WITH DOUBLE-EDGE INTERRUPT REQUEST SIGNALS DETECTION

FIELD OF THE INVENTION

The present invention relates to an interrupt masker for use in an interrupt handler, and more particularly to an interrupt masker having the capability to handle double-edge interrupt request signals.

BACKGROUND ART

Many computer systems are designated to interface with one or more peripheral devices. A computer system typically includes a central processing unit (CPU) connected to a system bus having data, address, and control lines. The bus is connected to other computer system components, such as program memory, and also to peripheral devices via a suitable interface. The interface may include interface devices for translating voltages or signal formats for compatibility between the computer system and the peripheral devices. Suitable interface connectors are often employed. Communication between the CPU and the peripheral devices can include sensory or command information. Specifically, a peripheral device acting as a sensor may produce data signals indicative of parameters the peripheral sensing device is sensing, such as temperature, voltage, or other parameters. The data signals may be translated to a suitable form and read through the interface by the CPU to provide the CPU with needed data regarding the sensed parameters. Alternatively, the peripheral devices may be controllers. the CPU commands a peripheral controlling device by writing suitable commands through the interface to the peripheral controlling device. The device then takes suitable action in accordance with the command.

In a system including a plurality of peripheral devices, frequent or continuing communication between the CPU and the peripheral devices is often necessary. Various schemes have been used for keeping the CPU in touch with the peripheral devices. A first scheme is called polling. In a polling system, the CPU executes a polling routine at intervals of time. Typically, a hardware timer will cause the CPU to execute the polling routine periodically. During the polling routine, the CPU reads information from the peripheral devices indicating whether the status of a sensed parameter has changed or whether there is a need to send a command to the peripheral device. Depending on the information received from a given peripheral device during the polling routine, the CPU takes appropriate action, such as sending commands to the peripheral device or updating a record of the status of the peripheral device stored in computer system memory. Polling is commonly used in computer systems which interface with a large number of peripheral devices. However, polling has the disadvantage that the polling routine must be executed frequently, thereby consuming a large amount of CPU processing time. in many instances, the status information read from the peripheral devices indicates that no action is necessary. Thus, the time spent executing the polling routine in retrospect proves to be unproductive. In computer system involving a great deal of activity or real-time applications, the time spent repeating the polling routine can reduce processing efficiency.

As an alternative to polling, computer systems often service peripheral devices by means of interrupts. In an interrupt system, a peripheral device sends a signal called an interrupt request when a condition is detected requiring some type of action by the CPU. Many CPUs are designed to include interrupt request input lines. A CPU having such an interrupt request input responds to a predetermined voltage signal on the interrupt request line by executing an interrupt service routine. Thus, an interface between a CPU and a peripheral device can include circuitry which detects a change of status in the peripheral device for which service is required and provides a suitable interrupt request signal to the CPU.

Interrupt handling circuits are well known in the prior art to control processing units upon receiving interrupt request signals from peripheral devices. Conventional interrupt handlers are either edge-triggered or level-triggered. When edge-triggered only one type of edges of the interrupt request signal, i.e. a high-to-low or a low-to-high transition, is detected.

The edge setting is done at the initialization of the system, by configurating all the inputs of the interrupt handler according to the corresponding attached peripheral device. These programmable interrupt handlers have the drawback that each input is definitively configured in one way, and is maintained until the process is ended.

In the present applications, it is mandatory that during the system operating, an interrupt request signal be indifferently processed on one type of transition or the other without disturbing the system operating cycle or without generating any undesirable glitches.

In known solutions, the interrupt request signal is inverted within an input port circuit of the interrupt handler upon reception of a polarity control signal which is generated by the processing unit each time an opposite polarity is requested. The interrupt handler therefore operates as accepting both edges of the interrupt request signal.

Unfortunately the polarity control signal generates a glitch which may be misinterpreted by the interrupt handler as being an occurrence of the interrupt request signal. To resolve this problem, software solutions have been implemented within the processing unit program to operate a Mask Interrupt Register which enables the valid interrupt requests and inhibits the unvalid ones. The drawback of such solution is that a very complex algorithm is needed to control the interrupt handler. Furthermore, several cycles are needed to perform the controled inversion function.

Another known solution is to implement an inhibit circuit within the input port circuit of the interrupt handler which is activated by the processing unit before the inversion control signal occurs and which is maintained several cycles to ensure that the inversion function is performed. However, the drawback of such solution is that the system performance is decreased.

Therefore there is a need for an efficient glitch free circuit that can change dynamically the edge polarity of the interrupt request signals. Such circuit has to be able to perform the edge polarity inversion within a processing unit cycle time.

SUMMARY OF THE INVENTION

It is an object of this invention to provide an interrupt handler for use in a computer system comprising a central processing unit connected by a computer system bus to a memory and to the interrupt handler. The interrupt handler receives interrupt request signals in the form of edge detection or level assertion and is able to handle both type of edge transitions of the interrupt request signal. The interrupt handler comprises an interrupt masker circuit comprising interrupt detection means for detecting edge transitions of the interrupt request signal. The interrupt masker also comprises a polarity detection means for detecting edge transitions of a polarity control signal which is inverted for each inversion polarity request. A filtering means which is coupled to the interrupt detection means and to the polarity detection means generates an interrupt request pulse according to the assertion of the polarity control signal. The interrupt request pulse is generated in response of either rising or falling edge transitions of the interrupt request signal.

It is another object of the invention to provide an interrupt masker free of glitches.

In a preferred embodiment, the arrangement of the interrupt masker is such that the interrupt detection circuit detects one type of edge transition of the interrupt request signal while the polarity detection circuit detects both type of edge transitions of the polarity control signal. The polarity detection circuit further includes an inversion logic circuit responsive to the interrupt request signal and to the polarity control signal for inverting the edge transition of the interrupt request signal when the polarity control signal is asserted.

In an alternate embodiment, the interrupt detection circuit detects both type of edge transition of the interrupt request signal whereas the polarity detection circuit is included within the filtering means.

DETAILED DESCRIPTION OF THE INVENTION

Figure 1:
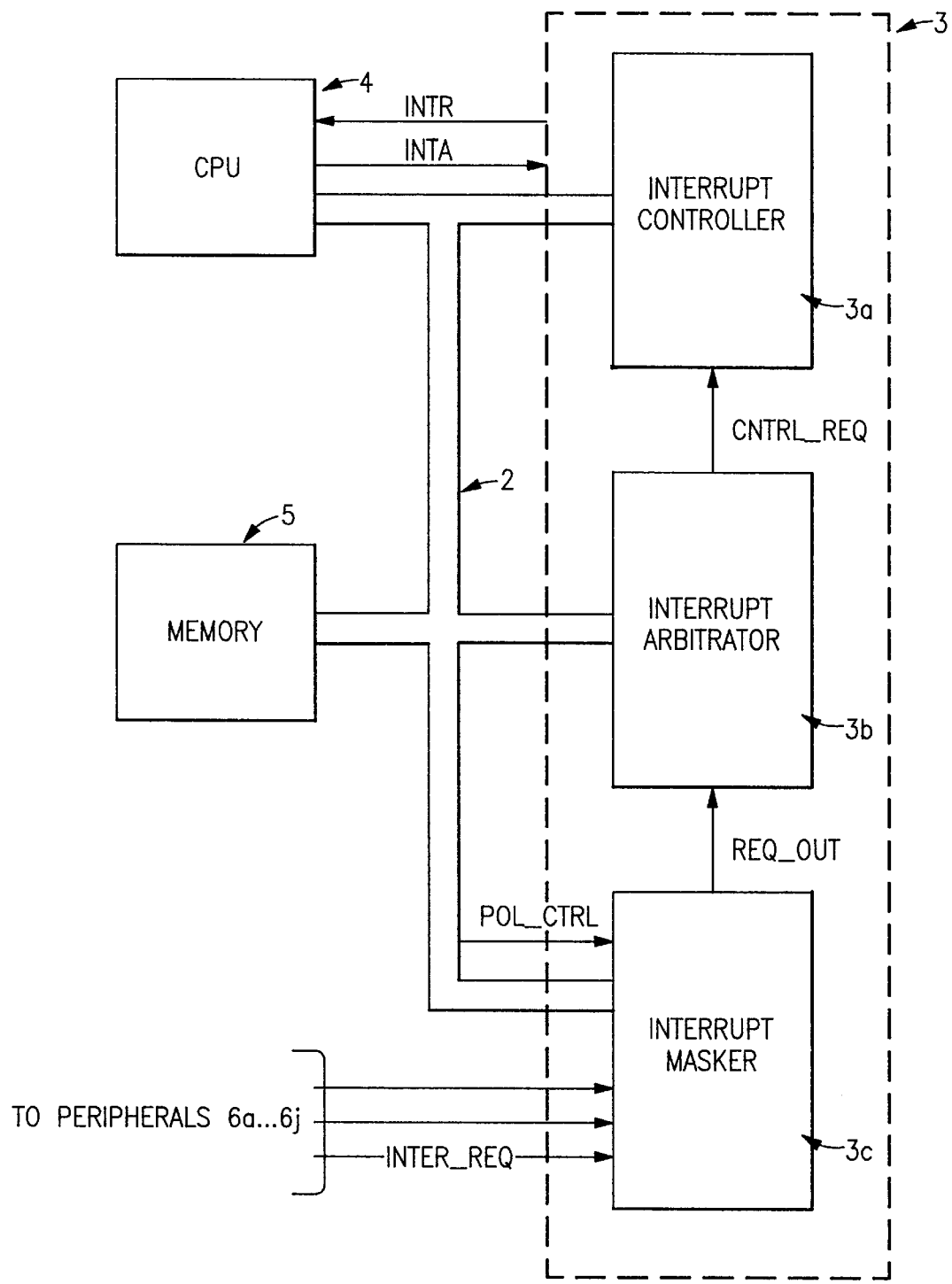
FIG. 1 is a block diagram of a computer system utilizing an interrupt handler in accordance with the invention.

Referring now to the drawings, and more particularly to FIG. 1, there is depicted a computer system employing an interrupt handler in accordance with the invention. A computer system bus 2 is connected to a central processing unit (CPU) 4, memory 5, and an interrupt handler 3. The interrupt handler 3 is connected to a plurality of peripheral devices 6a–6j which may be sensing or monitoring devices, such as thermocouples or voltage sensors, or control devices, such as motors, electronic switches or other devices, suitable for computer controlled applications. In addition to being external peripheral devices the devices may also be internal devices. The devices 6a–6j have interrupt request outputs which are connected via lines to interrupt request inputs on the interrupt handler 3. The interrupt handler 3 includes an interrupt request input on the CPU 4, an interrupt acknowledge line INTA which is connected to carry an interrupt acknowledge signal from the CPU 4 back to the interrupt handler 3. The lines INTR, INTA are usually treated as part of a system bus including data, address, and control lines. For the purpose of illustration, however, FIG. 1 shows the interrupt request line INTR and the interrupt acknowledge line INTA running between the interrupt handler 3 and the CPU 4 as separate lines. The internal devices that generate internal interruption requests are not necessarily discrete elements and can be a system timer, for example.

The interrupt handler 3 includes an interrupt controller 3a, an interrupt arbitrator 3b and an interrupt masker 3c. The interrupt controller 3a, the interrupt arbitrator 3b and the interrupt masker 3c are coupled to the bus 2. The CPU 4 communicates with the interrupt controller 3a, which receives an arbitrated interruption request signal (CNTRL_REQ) from the interrupt arbitrator 3b when a peripheral or internal device 6a–6j sends an interrupt request signal that wins arbitration. Arbitration is a method of selecting a device from among a plurality of contending devices for use of a common resource. The interrupt arbitrator 3b which processes the arbitration receives signals from the bus 2 and the interrupt acknowledge signal (INTR_ACK) from the CPU 4. The interrupt arbitrator also receives a filtered interruption request signal (REQ_OUT) from the interrupt masker 3c. The interrupt masker 3c receives signals from the bus 2, such as CPU Address, qualifiers of the transfer (Read/Write controls) and data. These signals are processed within a standard decoding block (not detailed here as not being part of the invention) to generate a suitable polarity control signal (POL_CTRL) in order to process directly the interrupt request signal or in its reverse phase.

The (POL_CTRL) signal which may occur at any time during a clock cycle, dynamically configurates the interrupt masker 3c in order to allow the detection of either a positive or a negative interrupt request signal (INTER_REQ) received from the corresponding peripheral device 6a–6j. The interrupt masker 3c eliminates the risk of generating any undesirable filtered interrupt request (REQ_OUT) which could be interpretated by the interrupt arbitrator 3b as a valid interrupt request. The circuit of the invention is therefore glitch free. The interrupt masker 3c includes a plurality of individual interrupt masker devices 3c(a) to 3c(j), each interrupt masker device being connected to one peripheral device 6a–6j.

Figure 2:
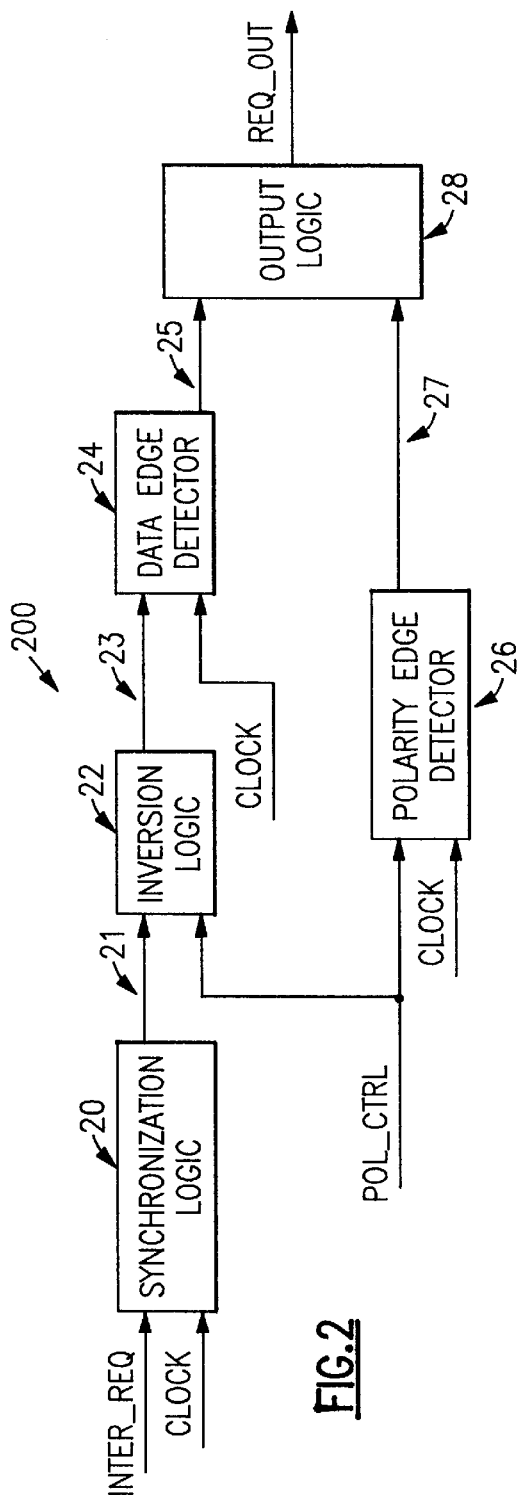
FIG. 2 is a block diagram of an interrupt masker constructed in accordance with the present invention.

FIG. 2 depicts a block diagram of the interrupt masker 3c setting out full details of the present invention. The interrupt masker 3c consists of five blocks: a Synchronization Logic block (20), an Inversion Logic block (22), a Data Edge Detector circuit (24), a Polarity Edge Detector circuit (26) and an Output Logic block (28).

The Synchronization Logic block (20) synchronizes the asynchronous signal (INTER_REQ) with the system clock (CLOCK). Interrupt requests are commonly asynchronous signals while the processing unit and the interrupt handler are synchronous to the system clock. Therefore a resynchronization is to be performed between the interrupt request signal and the system clock. The output of block (20) generates a synchronize interrupt request signal SYNCINTER_REQ) on line 21 which is provided to one input of the Inversion Logic block (22).

The Inversion Logic block (22) is a controlled inverter which receives on the other input the polarity control signal (POL_CTRL). The phase of the signal generated on the output of the Inversion Logic block (line 23) depends on the assertion of the polarity control signal (POL_CTRL). A rising assertion of (POL_CTRL) dynamically inverts within the Inversion Logic block (21) the polarity of the synchronized interrupt request signal which is present on line 21. A falling assertion of (POL_CTRL) maintains on the output, the same polarity than the one of the input signal.

The Polarity Edge Detector (26) detects both types of transitions of the (POL_CTRL) signal and generates a masking pulse on the output line 27. The Polarity Edge Detector is preferably clocked by the system clock (CLOCK). If either a low-to-high or a high-to-low edge transition of (POL_CTRL) has been detected, the pulse generated on the output line 27 inhibits the Output Logic block (30).

The Data Edge Detector (24) receives the signal issued from the Inversion Logic Block (22) on line 23. The Data Edge Detector operates on the rising transitions occuring on line 23 and is preferably clocked by the system clock (CLOCK). An interrupt request pulse is generated on the output line 25 which corresponds to the detection of the interrupt request information issued from the Synchronization Logic block (20) according to the assertion of the polarity control signal.

The last block of the interrupt masker is the Output Logic block (28). This circuit compares both the pulse signal issued from the Data Edge Detector (24) and the masking pulse issued from the Polarity Edge Detector (26). The output (REQ_OUT) of block (28) remains inactive when a masking pulse is detected on line 27 otherwise an interrupt request pulse is generated corresponding to the pulse signal inputs from line 25.

Figure 3:
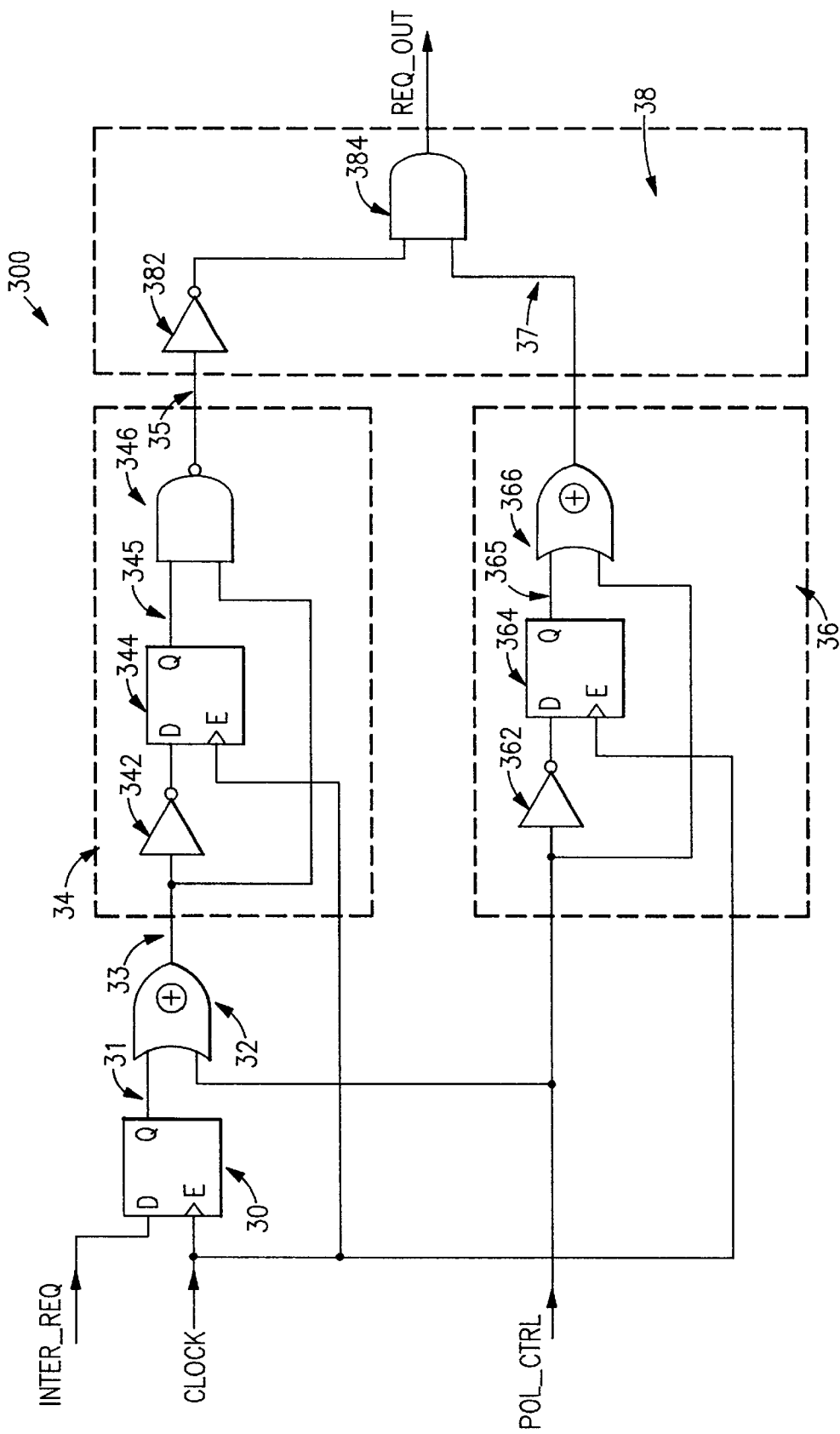
FIG. 3 illustrates a logic diagram of an interrupt masker constructed in accordance with a preferred embodiment of the present invention.

FIG. 3 detailed a preferred logic implementation of the interrupt masker of FIG. 2.

When a peripheral device 6a–6j sends an interrupt request (INTER_REQ) to the interrupt handler, latch (30) senses the transition and sets on a clock cycle to the corresponding high or low level.

The output (33) of the Exclusive-OR (XOR) gate (32) which is connected to the output of latch (30) depends on the states of the ouput (line 31) of latch (30) and of the polarity control signal (POL_CTRL) which is input to a second input of the XOR. The interrupt request is inverted within the XOR gate when the polarity control signal is asserted. The output (line 33) of XOR gate (32) is then input to a first inverter (342) of the Data Edge Detector circuit (34) and to a NAND gate (346). The output of the inverter is latch within latch (344) on a clock cycle. The output (345) of lacth (344) is also an input of the NAND gate (346). The NAND gate (346) enables interrupt request pulses on line 35.

The polarity control signal (POL_CTRL) is also input to a first inverter (362) and to a XOR gate (366) of the Polarity Edge Detector (36). The latch (364) sets to the inverted level of the polarity control signal on a clock cycle (line 365). The XOR gate (366) enables masking pulses on line 37 when a transition of the polarity control signal occurs.

The output (line 37) of XOR gate (366) is input to a AND gate (384) of the Output Logic Block (38). Likewise the inverted output of NAND gate (346) is input to AND gate (384). The AND gate (384) finally enables interrupt request pulses (REQ_OUT) to be generated only for a valid interrupt request sent from a peripheral device, thereby inhibiting any undesirable pulses.

Figure 4A:
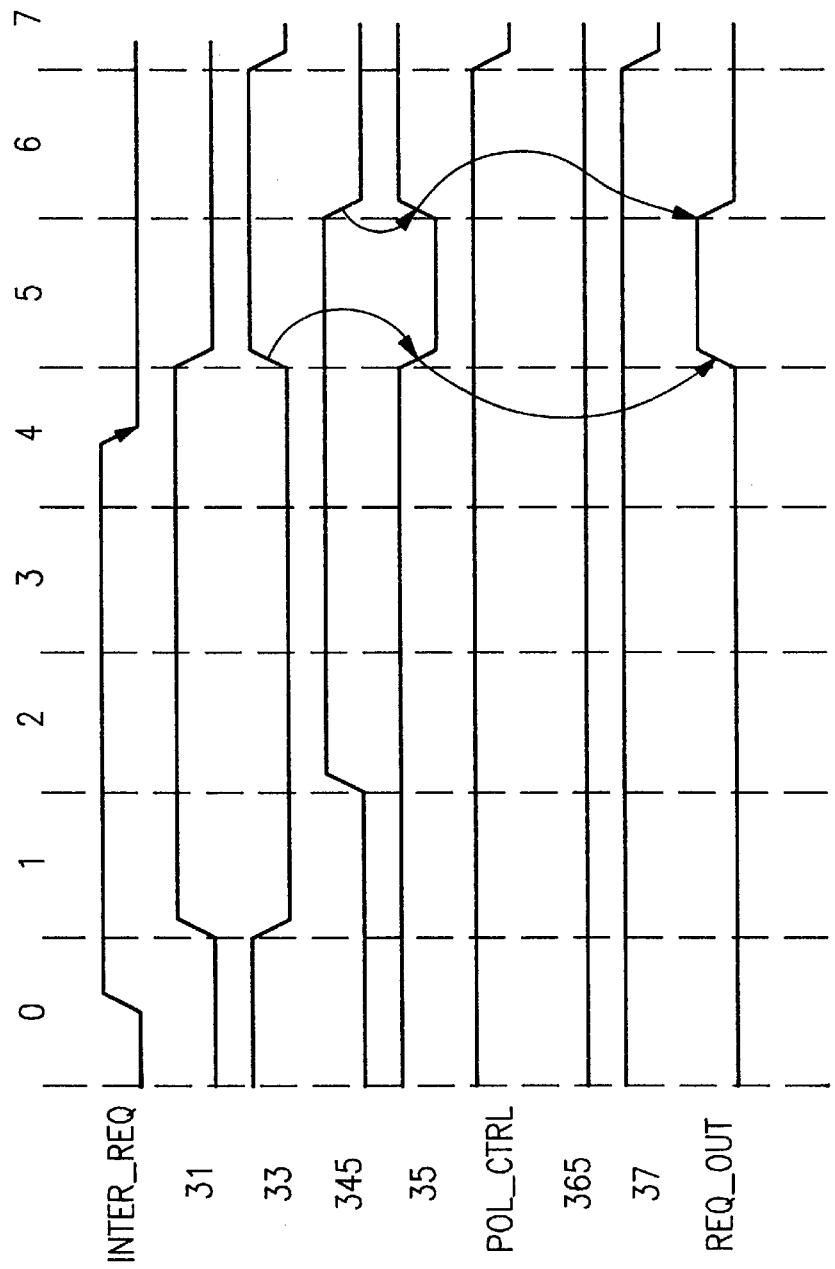
FIGS. 4a to 4c are timing diagrams in accordance with the circuit of FIG. 2.
Figure 4B:
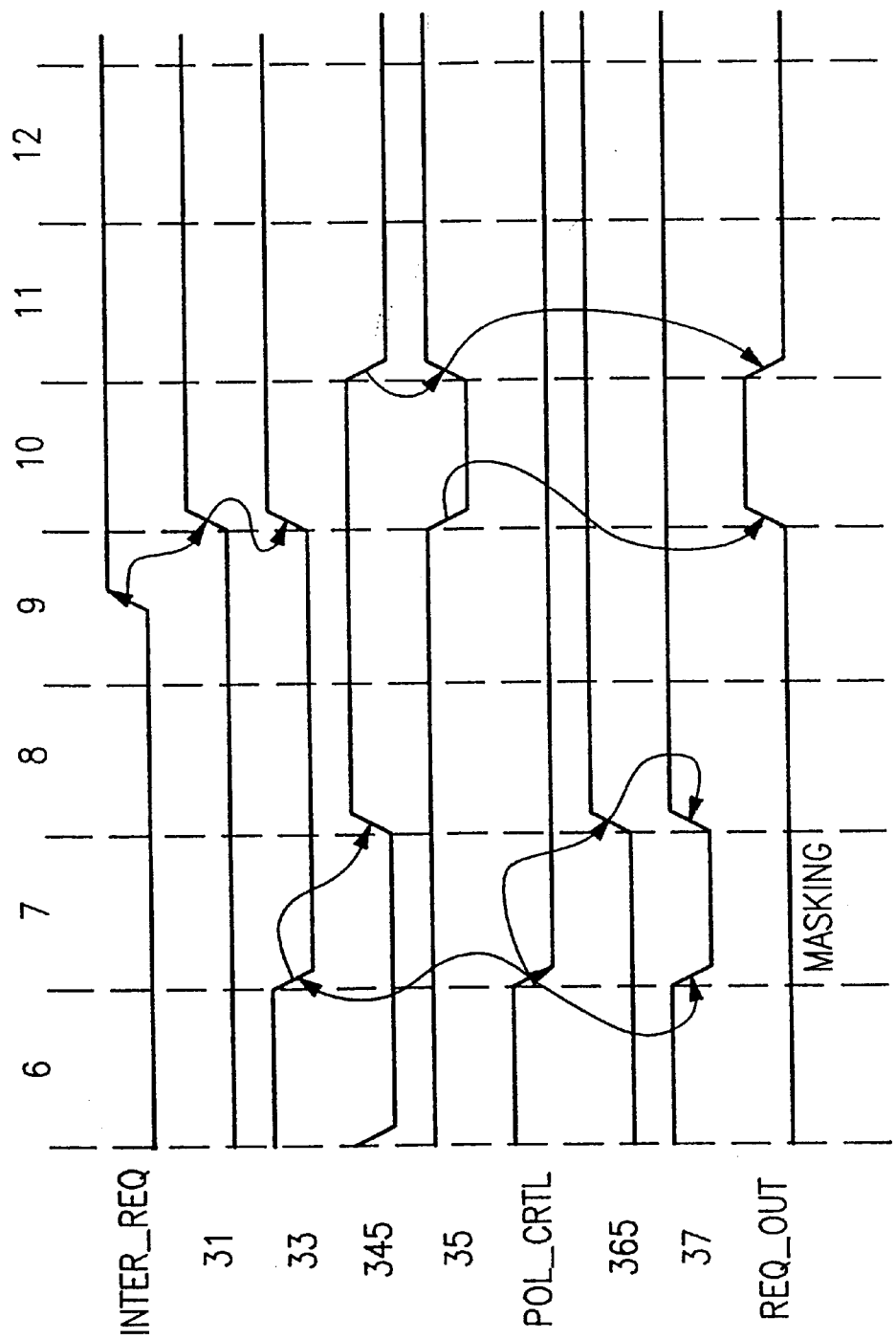
Figure 4C:
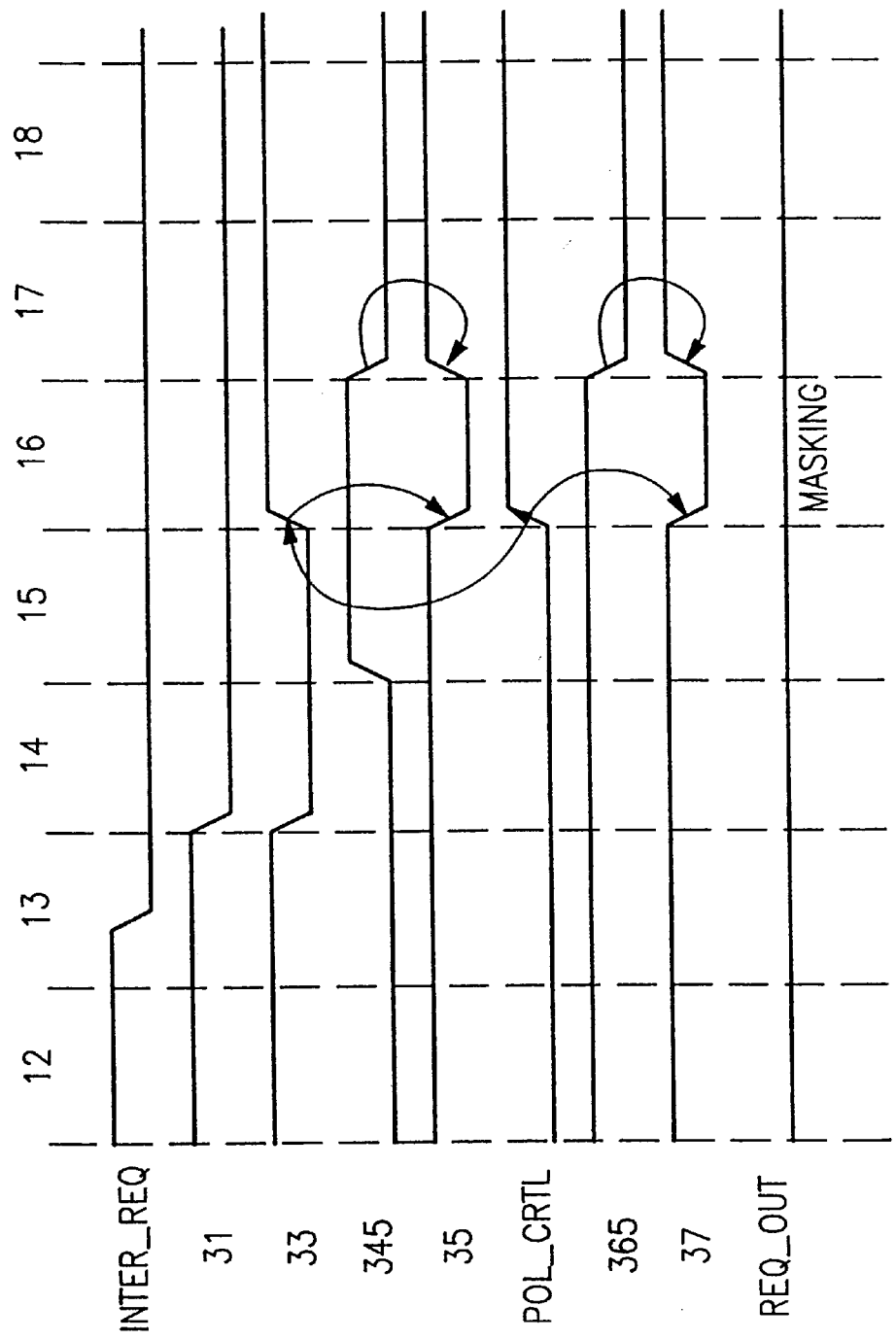

FIG. 4a to 4c is a timing diagram illustrating the waveforms of the different signals of the circuit of FIG. 3 according to different scenarios. For all figures, it is assumed that the polarity control signal is a high active signal, and that the interrupt request (INTER_REQ) is a low-to-high active signal. However, the skill person will easily understand that the circuit is operable with others assumptions.

On FIG. 4a (cycle 0 to cycle 6), a low-to-high transition of an interrupt request is send on cycle 0. The latch (30) is set high (line 31) on cycle 1. As the polarity control signal is already set high, the XOR gate output (line 33) inverts which also sets high the output (line 345) of latch (344) on the next cycle (cycle 2). The output of the Data Edge Detector (line 35) remains high. In this configuration, the output (line 37) of the Polarity Edge Detector remains high, as no polarity transition is sensed. Thereby, the output (REQ_OUT) of the circuit of FIG. 3 remains low as no interrupt request as to be interpreted as a valid interrupt request.

On a further cycle (cycle 4) a high-to-low transition of the interrupt request signal occurs. This transition is sensed on cycle 5 (line 31) and next inverted (line 33) as the polarity control signal is active. This inverted transition is routed through the Data Edge Detector to invert its output (line 35). This assertion is next interpreted by the Output Logic Block as a valid interrupt request signal, and an interrupt request pulse is generated on the REQ_OUT line which times one cycle.

On FIG. 4b (cycle 7 to cycle 12), the polarity control signal is set low (cycle 7) meaning that no polarity inversion is required and that an interrupt request is processed on the low-to-high transitions. The polarity inversion is routed through the Polarity Edge Detector which output is set low (line 37) on cycle 7 thereby inhibiting any pulse on the REQ_OUT line.

Simultaneously, the inversion of the polarity control signal inverts the output (33) of the XOR gate but this inversion which is routed through the Data Edge Detector is not interpreted as a valid transition and the output (line 35) remains high. The output (345) of latch (344) is deasserted on cycle 7.

On a further cycle (cycle 9), a positive interrupt request signal occurs which sets the output of latch (30) to a high level (line 31). As the polarity control signal is inactive (low level) the transition of line 31 is directly transmitted to the Data Edge Detector on line 33 through the XOR gate. This asserted transition is interpreted as a valid transition by the Data Edge Detector and a calibrated pulse (one clock cycle duration) appears on line 35 during cycle 10. As the polarity control signal is maintain stable, no transition occurs on the output of the Polarity Edge Detector (line 37), thereby the Output Logic block generates a valid interrupt request pulse (REQ_OUT) during cycle 10.

FIG. 4c illustrates first the case where no interrupt request pulse is generated for a high-to-low transition of an interrupt request whereas the polarity controls signal is maintained inactive. This situation is shown from cycle 13 to cycle 14. A last case is also shown on FIG. 4c where a polarity inversion is inhibited, thereby generating no undesirable glitch on the output of the Output Logic block. A low-to-high transition of (POL_CTRL) signal during cycle 16 is transmitted to the output of the XOR gate (32) on line 33. This transition is interpreted by the Data Edge Detector and a corresponding transition occurs on line 35.

Simultaneously, the polarity control signal transition is also interpreted by the Polarity Edge Detector and a masking pulse appears on line 37. Therefore, the undesirable pulse appeared on line 35 is inhibited by the masking pulse on line 37, and no (REQ_OUT) pulse is generated.

From the above description, it easily appears to the skill person that the circuit of the invention is glitch free.

Figure 5:
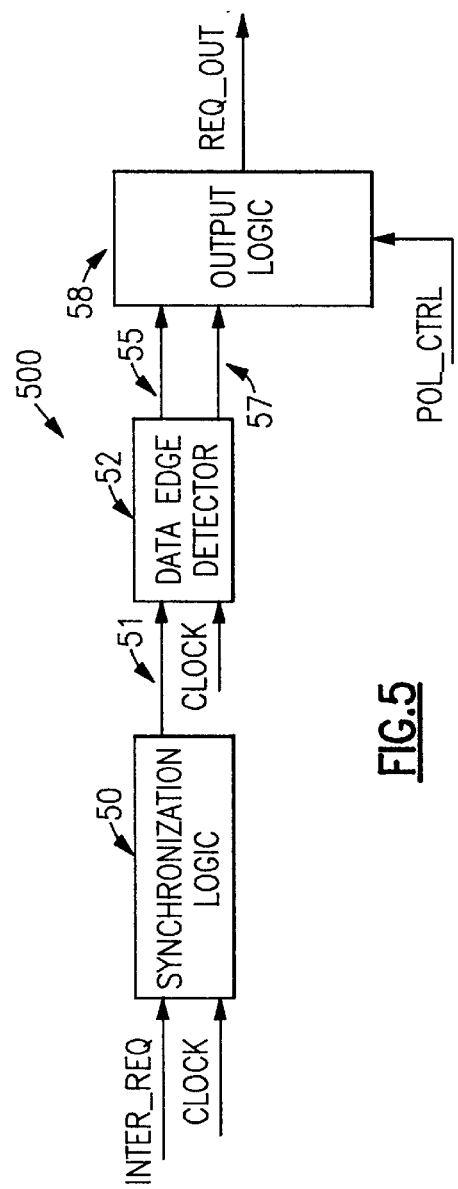
FIG. 5 is an alternate block diagram of an interrupt masker constructed in accordance with the present invention.

FIG. 5 shows an alternate block diagram of the present invention. The interrupt masker (500) consists of a Synchronization Logic block (50), a Data Edge Detector circuit (52) and an Output Logic block (58). Preferably, the circuit includes the Synchronization Logic block (50) to synchronize the asynchronous signal (INTER_REQ) with the system clock (CLOCK). The output of block (50) generates a synchronized interrupt request signal (SYNCINTER_REQ) on line 51 which is provided as an input to the Data Edge Detector (52). The latter indifferently operates on either a rising or a falling edge transition of an interrupt request signal and is preferably clocked by the system clock (CLOCK) to generate calibrated pulses on the outputs (55,57). A first output (55) is responsive to one type of edge transition and a corresponding calibrated pulse is generated. The second output (57) is responsive to the other type of edge transition of the interrupt request signal and a corresponding calibrated pulse is generated. The first output of the Data Edge Detector is a first input (55) of the Output Logic block (58). Similarly, the second output of the Data Edge Detector is a second input (57) of the Output Logic block (58).

The Output Logic block (58) also receives as a third input the polarity control signal (POL_CTRL) which enables either one or the other calibrated pulse according to the polarity control signal value. The output (REQ_OUT) of block (58) remains inactive when no pulse is detected on the outputs of the Data Edge Detector (lines 55 and 57). In any other case, a calibrated interrupt request pulse (REQ_OUT) is generated.

Figure 6:
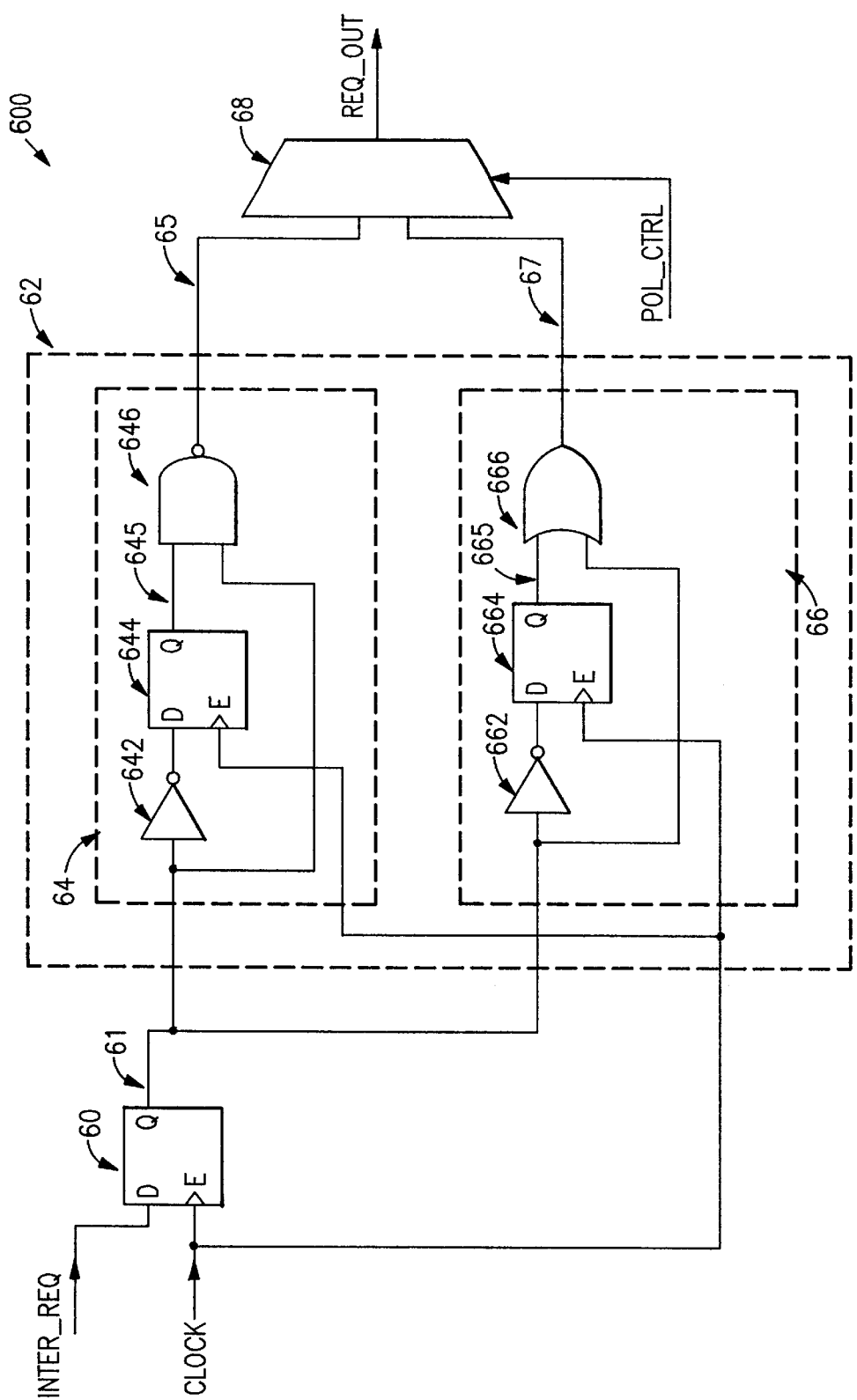
FIG. 6 illustrates a logic diagram of a first embodiment in accordance with the interrupt masker of FIG. 5.
Figure 7:
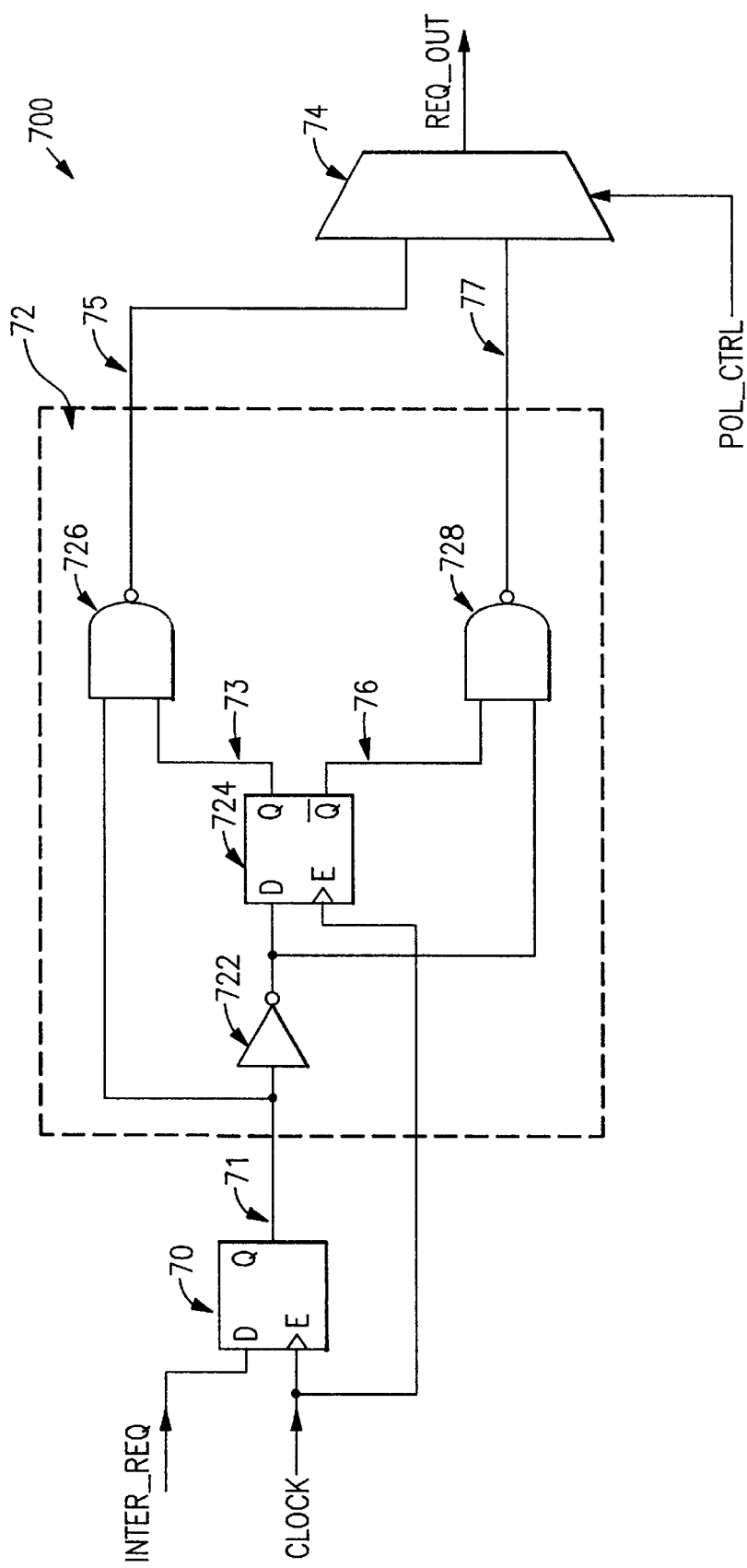
FIG. 7 illustrates a logic diagram of a second embodiment in accordance with the interrupt masker of FIG. 5.

FIGS. 6 and 7 illustrate alternate implementation of the circuit of FIG. 5, and are now described with reference to the timing diagram of FIG. 8.

In the embodiment of FIG. 6, the Data Edge Detector is composed of two Edge Detector circuits: a Positive Edge Detector circuit (64) and a Negative Edge Detector circuit (66). The Positive Edge Detector circuit (64) operates only on rising edge transition of the interrupt request signal whereas the Negative Edge Detector circuit (66) operates only on falling edge transition of the interrupt request signal. If a rising transition of an interrupt request signal occurs whereas the polarity control signal asserts rising transition (state 1), the Positive Edge Detector (64) which operates similarly to the Data Edge Detector (34) of FIG. 3, generates a calibrated pulse on its output line (65). The Negative Edge Detector (66) remains inactive. The Output Logic block which is a standard multiplexer controled by the polarity control signal, transmits the calibrated pulse on its output line (REQ_OUT) as it can be seen from cycle 0 to cycle 2 of FIG. 8. Likewise, if a falling transition of an interrupt request signal occurs whereas the polarity control signal asserts falling transition (state 0), the Negative Edge Detector (66) generates a calibrated pulse on its output line (65). The Positive Edge Detector (66) remains inactive. The Output Logic block which is controled by the polarity control signal transmits the calibrated pulse on its output line (REQ_OUT) as it can be seen from cycle 4 to cycle 6 of FIG. 8.

Figure 8:
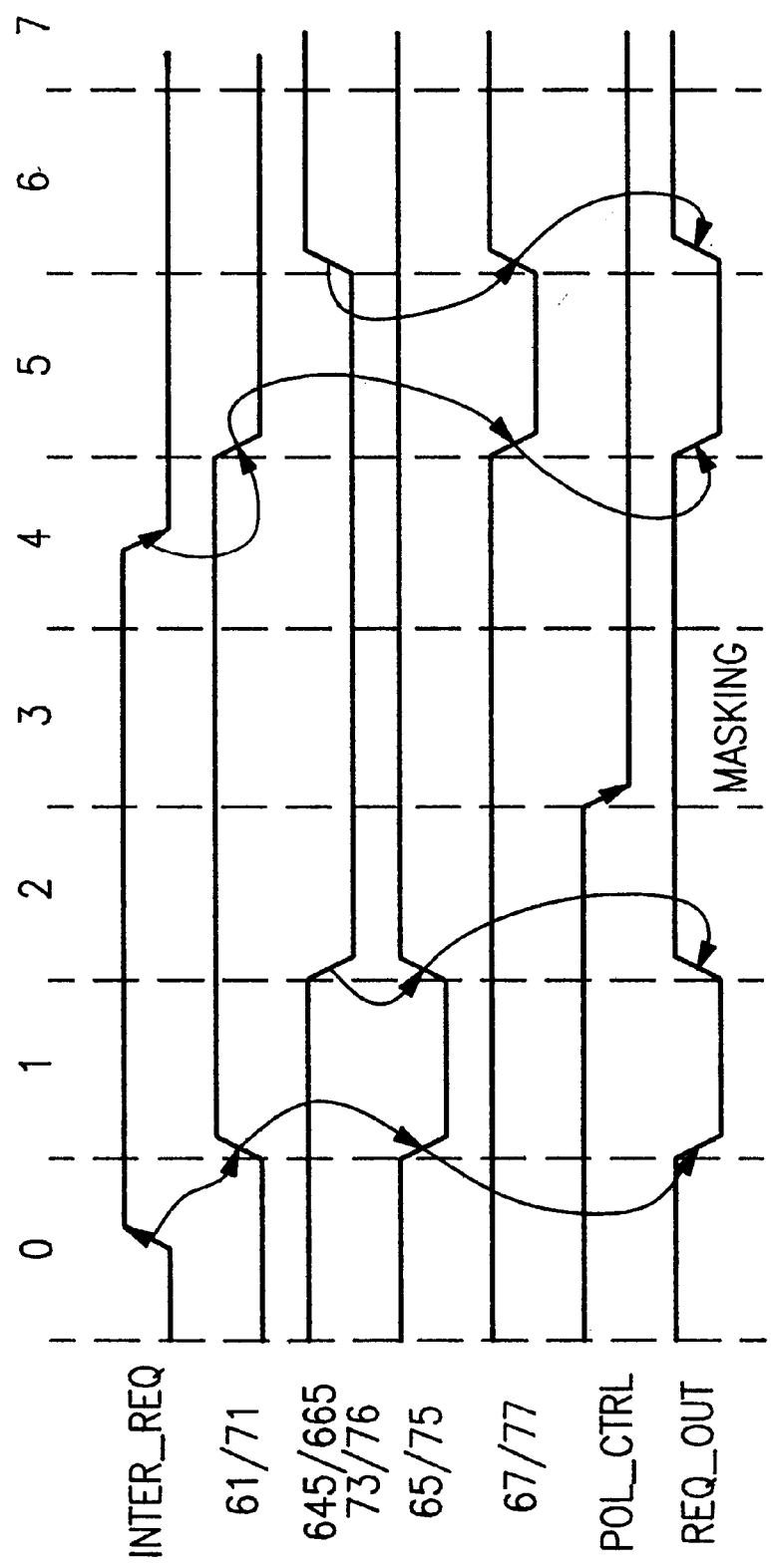
FIG. 8 is a timing diagram in accordance with the circuit of FIG. 6 or 7.

When the polarity control signal is inverted, the output of the Output Logic block remains inactive as shown on cycle 3 of FIG. 8.

FIG. 7 illustrates another embodiment of the invention wherein the Data Edge Detector (52) is implemented with a unique detection circuit (72) which operates on both type of edge transitions. The Synchronisation circuit (70) and the Output Logic block (74) remains unchanged. The timing diagram on FIG. 8 illustrates the operating of this embodiment with the corresponding references of the circuits of FIGS. 6 and 7.

The embodiment of the present invention described above is exemplary only, it will be understood by those skilled in the art that various change in form and details may be made without departing from the spirit and scope of the invention.

What is claimed is:

1. An interrupt masker comprising:
   interrupt detection means for detecting edge transitions of an interrupt request signal;
   polarity detection means for detecting edge transitions of a polarity control signal;
   filtering means coupled to the interrupt detection means and to the polarity detection means for generating an interrupt request pulse, said pulse being generated in response of either rising or falling edge transitions detection of the interrupt request signal whether an edge transition of the polarity control signal is detected by said polarity detection means.

2. The interrupt masker of claim 1 wherein:
   said interrupt detection means includes means for detecting one type of edge transition of the interrupt request signal; and
   said polarity detection means includes
      double-edge transition detection means for detecting both type of edge transition of the polarity control signal; and
      inversion logic means responsive to the interrupt request signal and to the polarity control signal for inverting the edge transition of the interrupt request signal when the polarity control signal is asserted.

3. The interrupt masker of claim 1 wherein:
   said interrupt detection means includes means for detecting both type of edge transition of the interrupt request signal; and wherein
   said polarity detection means is included within said filtering means.

4. The interrupt masker of claim 1 further comprising means for synchronizing the interrupt request pulse on a system clock.

5. The interrupt masker of claim 1 wherein the interrupt request signal is received from internal or external peripheral devices.

6. An interrupt masker comprising:
   interrupt detection means for detecting edge transitions of an interrupt request signal;
   polarity detection means for detecting edge transitions of a polarity control signal;
   filtering means coupled to the interrupt detection means and to the polarity detection means for generating an interrupt request pulse, said pulse being generated in response of either rising or falling edge transitions detection of the interrupt request signal whether an edge transition of the polarity control signal is detected by said polarity detection means, and wherein the filtering means includes compare means responsive to the interrupt request detection means and to the polarity control signals.

7. The interrupt masker of claim 6 wherein:
   said interrupt detection means includes means for detecting one type of edge transition of the interrupt request signal; and
   said polarity detection means includes
      double-edge transition detection means for detecting both type of edge transition of the polarity control signal; and
      inversion logic means responsive to the interrupt request signal and to the polarity control signal for inverting the edge transition of the interrupt request signal when the polarity control signal is asserted.

8. The interrupt masker of claim 6 further comprising means for synchronizing the interrupt request pulse on a system clock.

9. The interrupt masker of claim 8 wherein the interrupt request signal is received from internal or external peripheral devices.

10. An interrupt masker comprising:

interrupt detection means for detecting edge transitions of an interrupt request signal;

polarity detection means for detecting edge transitions of a polarity control signal;

filtering means coupled to the interrupt detection means and to the polarity detection means for generating an interrupt request pulse, said pulse being generated in response of either rising or falling edge transitions detection of the interrupt request signal whether an edge transition of the polarity control signal is detected by said polarity detection means, and wherein the filtering means includes multiplexing means responsive to the interrupt detection means and controlled by the polarity control signal.

11. The interrupt masker of claim 10 wherein:

said interrupt detection means includes means for detecting both type of edge transition of the interrupt request signal; and wherein said polarity detection means is included within said filtering means.

12. The interrupt masker of claim 10 further comprising means for synchronizing the interrupt request pulse on a system clock.

13. The interrupt masker of claim 11 wherein the interrupt request signal is received from internal or external peripheral devices.

14. An interrupt handler for receiving interrupt request signals being in the form of edge detection or level assertion, comprising the interrupt masker of claim 1.

15. The interrupt handler of claim 14 for use in a computer system comprising central processing unit connected by a computer system bus to a memory and to the interrupt handler.

* * * * *